3,205,276
PREPARATION OF SECONDARY BUTYLBENZENES

William G. Toland, San Rafael, Calif., assignor to California Research Corporation, San Francisco, Calif., a corporation of Delaware
No Drawing. Filed Mar. 13, 1961, Ser. No. 95,037
9 Claims. (Cl. 260—671)

This invention relates to a novel process for the preparation of a secondary butylbenzene. More particularly, the invention has to do with the preparation of a secondary butylbenzene by reacting an aromatic hydrocarbon, e.g., benzene or toluene, and ethylene is the presence of a polymerization-alkylation catalyst system comprising aluminum metal and the reaction product of aluminum metal with a halide, such as hydrogen chloride or hydrogen bromide. Secondary butylbenzenes have utility as intermediates, such as in the production of aromatic acids by oxidation, and of methylethylketone and phenol by the cleavage of the secondary butylbenzene hydroperoxide, as indicated, for example, in U.S. Patent No. 2,967,891.

It is well known in the art to react benzene and ethylene to produce ethylbenzene under suitable conditions in the presence of a Friedel-Crafts type catalyst. These conditions generally involve an alkylation catalyst comprising a metal halide, e.g., aluminum chloride, zinc chloride, or iron chloride, at temperatures ranging from 125° F. to 250° F. It has also been proposed to expedite the ethylation reaction by the use of hydrogen chloride or an alkyl halide.

It has unexpectedly been found that if ethylene and an aromatic hydrocarbon, such as benzene, are heated in the presence of a halide, such as hydrogen chloride, and an excess of metallic aluminum, the major product is a secondary butylbenzene. In the absence of proper conditions, simple ethylation of the benzene occurs or oily ethylene polymers are produced. It is believed that the reaction proceeds by an initial polymerization of ethylene to a butene, and that this butene, which is the simplest polymer of ethylene to contain secondary positions, is then capable of alkylating the aromatic compound under the conditions employed.

More particularly, the invention is carried out by reacting a simple aromatic hydrocarbon, such as benzene with ethylene at a temperature in the range 60° F. to 180° F., preferably 80° F. to 120° F., in the presence of a catalytic amount of aluminum metal, in addition to the reaction product of aluminum metal and an activator halide, such as hydrogen chloride, hydrogen bromide, ethyl chloride, or ethyl bromide. A suitable reaction time is ¼ hour to 12 hours, shorter reaction times being required at temperatures nearer the upper end of the specified temperature range and longer reaction times at lower temperatures. For the maximum production of mono-secondary butylbenzenes, conversions are held between 5% and 50%, disecondary butylation being favored at higher conversions, the degree of conversion being dependent on temperature and reaction times, conversion being highest at the higher temperatures and longer reaction times. Generally, a reaction time of 2 to 3 hours employing a temperature of 80° F. to 120° F. will be found particularly suitable.

As to the proportions of reactants, the amount of ethylene can vary from about 0.1 to 20 mols per mol of the simple benzene compound, a preferred range being about 0.2 to 10 mols per mol of the aromatic hydrocarbon. It is desirable to avoid the use of a large excess of ethylene over the aromatic reactant to minimize polyalkylation and the simple polymerization of ethylene. It is further noted that when dialkylation occurs, orientation is largely para. In addition, polyalkylation, if not controlled, can lead to large amounts of hexaethylbenzene.

It would also appear that the olefin is limited to ethylene, for when higher olefins are employed, they alkylate the aromatic compound directly rather than first undergoing any dimerization. The aromatic compound, on the other hand, can be a simple benzene, that is, benzene itself or a primary or secondary monoalkylated benzene having a single alkyl side group of 1 to 15 and more carbon atoms.

The amount of aluminum metal employed in comminuted form, for example, aluminum filings or aluminum powder, is such that there is present at the end of reaction at least a trace amount of unreacted or free metal. This, of course, will depend on the proportion of hydrogen halide employed, and the conditions under which aluminum and the hydrogen halide are brought into contact. In carrying out the reaction, 1 to 50% by weight of aluminum based on aromatic compounds can be employed.

In general, the hydrogen halide activator can be employed in proportion of 0.01 to 1 mol per mol of aromatic compound and the aluminum metal in a molar ratio to hydrogen halide exceeding a ratio of ⅓ and preferably greater than 1. As will readily be understood by those skilled in the art, there is no critical limit with respect to the amount of unreacted aluminum present during the alkylation reaction. Further, as stated, since it is important that free aluminum be present, the controlling consideration is the proportion of hydrogen halide which reacts with the aluminum, the reaction being carried out in such manner as to leave unreacted aluminum. This can be accomplished by bleeding hydrogen chloride from the system so as to prevent the aluminum from being completely used in the reaction. Conversely, if all the aluminum is reacted, additional aluminum can be added during the course of reaction, thereby ensuring the presence of unreacted aluminum.

In one embodiment of the invention, the aluminum metal and the aromatic compound are charged to a closed vessel capable of withstanding pressure. A suitable halide, e.g., hydrogen chloride, is then pressured into the autoclave, and the contents shaken. An exothermic reaction, which consumes the bulk of the hydrogen chloride, occurs. It is believed that the reaction produces hydrogen and mixed aluminum halides including subhalides. At this point, that is, at the peak exotherm or preferably when temperature beings to drop, ethylene is pressured into the vessel. If desired, residual pressure remaining after reaction of aluminum and hydrogen halide can first be bled prior to the introduction of the ethylene. At any rate, after introduction of the ethylene, conveniently achieved at room temperatures, the vessel is heated in the range 60° F.–180° F., preferably 80° F.–120° F., with shaking. As ethylene is consumed, the pressure drops, whereupon additional ethylene is introduced. When the rate of reaction ceases or substantially slows down, the vessel is cooled, the gaseous products bled through a Dry Ice-cooled (solid carbon dioxide) trap, which condenses any butenes, and through a wet test meter which measures any unconverted ethylene. Liquid products from the vessel are then distilled to obtain separate fractions of unreacted benzene, polyalkylated benzene, and a residue of polyethylene oils. The identity and composition of the secondary butyl benzene fractions can be established by infrared analysis as well as boiling point.

As suggested above, another embodiment of the invention for the preparation of secondary butylbenzenes involves effecting the desired reactions in separate vessels. Thus, it may be desirable to preform the catalyst by reacting the aluminum metal and hydrogen chloride in the presence of an inert diluent to obtain a reaction product comprising the halide product of aluminum, unreacted aluminum and hydrogen dissolved in the diluent. As diluent, it is most expeditious to employ the hydrocarbon to be alkylated, such as benzene or toluene, although any inert diluent which is liquid under the conditions of reaction such as saturated aliphatic hydrocarbons and aromatic hydrocarbons can be employed. Reaction temperatures and times can be the same as those already specified for the alkylation reaction, namely, 60° F. to 180° F. and ¼ to 20 hours, respectively.

Following the preparation of the catalyst, as above, the reaction products may then be used in the same vessel or transferred to another vessel for reaction of the aromatic compound with the ethylene as hereinabove already described.

The following examples illustrate the practice of the invention.

EXAMPLE 1

(a) Preparation of catalyst

Powdered aluminum (15 g.) and toluene (43.5 g.) were charged to a stainless steel autoclave having a capacity of 260 cc. The autoclave was then pressured to 200 p.s.i.g. with dry hydrogen chloride. The reactor was sealed and shaken without external cooling for a period of 15 minutes. An exothermic reaction occurred during this time. After the peak exotherm had been reached, the reactor was cooled to room temperature, and the residual pressure released.

(b) Reaction with ethylene to give secondary butyl toluene

The autoclave, containing the catalyst as thus prepared was charged with ethylene to a pressure of 500 p.s.i.g. The autoclave was shaken and an immediate exothermic reaction occurred; external cooling was required to maintain the temperature below 150° F. When the pressure had dropped to 380 p.s.i.g. at this temperature, the reactor was opened and the gases released slowly. It was then recharged with ethylene to 860 p.s.i.g., at a reactor temperature of 120° F. When shaking of the autoclave was resumed, another exothermic reaction took place, and the pressure dropped to 225 p.s.i.g. Temperature was held at or below 150° F., by external cooling when necessary. The pressure was released again and the reactor recharged with ethylene to 860 p.s.i.g. This same procedure of charging, reacting, bleeding and recharging to a pressure of 860 p.s.i.g. at a temperature below 150° F., was repeated 6 more times over a period of 3 hours. Finally the autoclave was cooled to room temperature. The volatile materials were bled through a Dry Iced-cooled trap and a wet test meter. Liquid products from the autoclave, after removal of unreacted toluene, were shown to contain 24 g. of secondary butyl toluene, and 9.7 g. polyalkyl toluenes.

Additional examples are tabulated below, the procedure involved in these examples being substantially like that of Example 1.

| Example No. | 2 | 3 | 4 | 5 | 6 | 7 | 8 | 9 | 10 |
|---|---|---|---|---|---|---|---|---|---|
| Autoclave volume, cc | 260 | 260 | 260 | 260 | 4500 | 4500 | 260 | 260 | 260 |
| (a) Preparation of catalyst: | | | | | | | | | |
| Aromatic: | | | | | | | | | |
| Kind | Benzene | Benzene | Benzene | Toluene | Benzene | Benzene | Benzene | Benzene | Benzene |
| Grams | 44 | 44 | 87 | 43.2 | 871 | 871 | 43 | 87.1 | 87.1 |
| Catalyst: | | | | | | | | | |
| Metal | Al | Al | Al | Al | Al | Al | Zn | $AlCl_3$ | $AlCl_3$ |
| Grams | 15 | 15 | 1 | 15 | 15 | 1 | 15 | 1 | 1 |
| Activator: | | | | | | | | | |
| Kind | HCl | HCl | HCl | HBr | HCl | HCl | HCl | None | HCl |
| P.s.i.g | 200 | 200 | 500 | 200 | 50 | 100 | 200 | | 200 |
| (b) Reaction with olefins: | | | | | | | | | |
| Olefin: | | | | | | | | | |
| Kind | Ethylene | Ethylene | Ethylene | Ethylene | Ethylene | Propylene | Ethylene | Ethylene | Ethylene |
| Number of recharges | 5 | 12 | 5 | 2 | 3 | 1 | 1 | 5 | 1 |
| P.s.i.g | 100–300 | 100–850 | 100–580 | 300 | 100–300 | (200 ml) | 300 | 300 | 300 |
| Temperature, °F | 80–113 | 90–118 | 104–195 | 100–118 | 60–270 | 50–250 | 80–215 | 95–120 | 90–117 |
| Time at temperature, min | 120 | 120 | 140 | 240 | 180 | 10 | 300 | 240 | 180 |
| Products after removal of volatile gases and unreacted aromatic feed: | | | | | | | | | |
| Ethyl benzene, g | 0 | 0 | 42.3 | 0 | 352.6 | [2]416 | 0 | 0 | 23.2 |
| Secondary butylbenzene, g | 6.3 | 11.8 | 13.0 | [1]6.9 | Trace | 0 | 0 | 0 | 0 |
| Diethyl benzene, g | | | 13.5 | | 70.7 | [2]70.6 | 0 | | |
| Polyakyl benzene, g | 4.5 | 3.2 | 22.4 | [1]5.1 | 36.0 | [2]16.2 | 0 | 0 | 15 |
| Polyethylene oils, g | 0 | 54.0 | 0 | [1]5.6 | | | 0 | 0 | 7.2 |

[1] These products are substituted toluenes rather than substituted benzenes.
[2] These products are isopropyl derivatives rather than ethyl derivatives.

In the table, the autoclave was usually recharged, as in Example 1, with olefin several times during the run. In those runs of the examples where olefin was recharged the number of times indicated, the pressure in the first few charges were in the range 300–500 p.s.i.g., the later repressurings of olefin sometime reaching a pressure of 850 p.s.i.g. at 150° F. It is to be noted that the degree of pressure was not determined to be critical.

Further, temperatures varied within the ranges indicated. In those runs where olefin was pressured in repeatedly, the reactor was usually cooled to the minimum temperature shown before releasing residual pressure and recharging with fresh olefin. In order to initiate the reaction, preliminary heating to a temperature of 90°–100° F. may be used.

Example 3 shows a large amount of polyethylene oil due to the large amount of ethylene employed.

In Example 4, lowering the amount of catalyst promotes the reactions of ethylation and butylation.

The effects of temperature are noted in Example 6, where high temperatures reduced catalyst selectivity, and only a trace of secondary butyl benzene was obtained.

Example 7 shows that propylene in place of ethylene, alkylates but does not dimerize prior to alkylation.

Example 8 indicates that the results desired are specific to aluminum.

In Examples 9 and 10 it is shown that the results are not due merely to $AlCl_3$, but require the presence of both free aluminum and halide.

I claim:

1. Process for the production of a secondary butylbenzene, which comprises subjecting in a reaction zone to a temperature in about the range 60° F. to 180° F., a reaction mixture consisting essentially of a simple benzene, ethylene and a catalytic amount of a catalyst consisting of aluminum metal and the reaction product of aluminum metal with a halide selected from the group consisting of hydrogen chloride, hydrogen bromide, ethyl chloride and ethyl bromide, sufficient aluminum metal being employed so that unreacted aluminum metal is present at the end of reaction.

2. Process according to claim 1, wherein the halide is hydrogen chloride.

3. Process according to claim 1, wherein the halide is hydrogen bromide.

4. Process according to claim 1, wherein the simple benzene is selected from the group consisting of benzene and toluene.

5. Process according to claim 4, wherein the molar ratio of aluminum to halide is greater than one-third.

6. Process for the production of a secondary butylbenzene, which comprises reacting in a reaction zone a reaction mixture consisting essentially of a simple benzene, aluminum metal and a halide selected from the group consisting of hydrogen chloride, hydrogen bromide, ethyl chloride and ethyl bromide, the aluminum metal being present in an amount of at least 1% by weight of the benzene compound, and the molar ratio of aluminum to halide being greater than one-third, then introducing into the reaction zone a charge consisting essentially of ethylene and effecting reaction between it and the benzene compound at a temperature in about the range 60° F. to 180° F., the amount of ethylene being in the range 0.1 to 20 mols per mol of the benzene compound, sufficient aluminum metal being employed so that unreacted aluminum metal is present at the end of reaction.

7. Process according to claim 6, wherein the simple benzene compound is selected from the group consisting of benzene and toluene.

8. Process according to claim 7, wherein the halide is hydrogen chloride.

9. Process according to claim 8, wherein the temperature is within the range of 80° F. to 120° F.

References Cited by the Examiner

UNITED STATES PATENTS

| | | | |
|---|---|---|---|
| 2,271,956 | 2/42 | Ruthruff | 260—671 |
| 2,388,428 | 11/45 | Mavity | 260—671 |
| 2,849,505 | 8/58 | Schmerling | 260—671 |
| 2,882,324 | 4/59 | Schmerling | 260—671 |

ALPHONSO D. SULLIVAN, *Primary Examiner.*

PAUL M. COUGHLAN, *Examiner.*